(12) United States Patent  (10) Patent No.: US 8,648,836 B2
Kao et al.  (45) Date of Patent: Feb. 11, 2014

(54) HYBRID POINTING DEVICE (71) Applicant: PixArt Imaging Inc., Hsin-Chu (TW)

(72) Inventors: Mig-Tsan Kao, Hsin-Chu (TW);
En-Feng Hsu, Hsin-Chu (TW);
Yen-Min Chang, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 0 days.

(21) Appl. No.: 13/754,135

(22) Filed: Jan. 30, 2013

(65) Prior Publication Data

US 2013/0141332 A1 Jun. 6, 2013

Related U.S. Application Data (63) Continuation-in-part of application No. 13/196,927, filed on Aug. 3, 2011, now abandoned, which is a continuation-in-part of application No. 12/770,875, filed on Apr. 30, 2010.

(51) Int. Cl.
G06F 3/042 (2006.01)

(52) U.S. Cl.
USPC .......................... 345/175; 345/173; 178/18.09

(58) Field of Classification Search
USPC ............. 345/156–184; 176/18.09; 178/18.09, 178/18.01–18.11
See application file for complete search history.

(56) References Cited

U.S. PATENT DOCUMENTS

| 4,589,140 | A | 5/1986 | Bishop et al. |
| 4,782,328 | A | 11/1988 | Denlinger |
| 5,484,966 | A | 1/1996 | Segen |
| 7,552,402 | B2 | 6/2009 | Bilow |
| 7,969,410 | B2 | 6/2011 | Kakarala |
| 8,004,660 | B2 | 8/2011 | Brown |
| 2004/0046741 | A1 | 3/2004 | Low et al. |
| 2004/0239653 | A1 | 12/2004 | Stuerzlinger |
| 2007/0152966 | A1 | 7/2007 | Krah et al. |
| 2008/0150898 | A1 | 6/2008 | Low et al. |
| 2008/0150913 | A1 | 6/2008 | Bell et al. |
| 2008/0259053 | A1 | 10/2008 | Newton |
| 2009/0058807 | A1 | 3/2009 | Kang et al. |
| 2009/0090569 | A1 | 4/2009 | Lin |
| 2009/0109178 | A1 | 4/2009 | Kim et al. |
| 2009/0146968 | A1 * | 6/2009 | Narita et al. ................... 345/173 |
| 2010/0026723 | A1 | 2/2010 | Nishihara et al. |
| 2010/0079413 | A1 | 4/2010 | Kawashima et al. |
| 2010/0265178 | A1 | 10/2010 | Benko et al. |
| 2011/0029185 | A1 | 2/2011 | Aoki et al. |
| 2011/0074684 | A1 | 3/2011 | Abraham et al. |

* cited by examiner

Primary Examiner — Dmitriy Bolotin
(74) Attorney, Agent, or Firm — Lowe Hauptman & Ham, LLP (57) ABSTRACT The present invention discloses a hybrid pointing device including an optical navigation module and a pointing module. The optical navigation module is configured to replace the conventional buttons of a convention pointing device, such as an optical mouse or a trackball mouse. The optical navigation module is configured to sense gestures of at least one object operated by a user to activate commands associated with particular programs running on the host. Since the optical navigation module is only configured to sense gestures of the object but not the movement of the hybrid pointing device relative to a surface, the resolution thereof is aimed to be sufficiently high enough for sensing gestures and no need to be relatively high.

19 Claims, 7 Drawing Sheets

HYBRID POINTING DEVICE

CROSS REFERENCE TO RELATED APPLICATION

This application is a continuation in part application of U.S. Ser. No. 12/770,875 filed Apr. 30, 2010 and U.S. Ser. No. 13/196,927 filed Aug. 3, 2011, the full disclosure of which are incorporated herein by reference.

BACKGROUND

1. Field of the Invention

This invention generally relates to a hybrid pointing device and, more particularly, to a hybrid pointing device including an optical navigation module configured to sense a gesture of at least one finger and a pointing module configured to sense a movement of the hybrid pointing device relative to a surface.

2. Description of the Related Art

For a conventional pointing device, e.g. an optical mouse and a trackball mouse, a pointer shown on a display of a host is controlled by a relative displacement between the pointing device and a surface. The pointing device generally includes two buttons (left and right buttons) for activating commands associated with the movement of the pointer on the display. Usually, when a user wants to execute a program, drag an icon, modify a picture, etc., the user moves the pointer on the display and points the pointer on a particular graphic user interface (GUI) then presses at least one button to activate commands. To enhance the applications of conventional pointing devices, some pointing devices are provided with more than two buttons; therefore, the user may define particular functions activated by pressing the additional buttons or by pressing several buttons simultaneously associated with moving the pointer on the display.

However, too many buttons integrated on a pointing device may confuse the user since the user can only operate the buttons with at most five fingers one time. For example, when the user tries to press as many buttons as he or she can, the user may hardly move the pointing device to move the pointer on the display.

There is another kind of pointing device which applies an optical sensor module in replace of the conventional mouse. The optical sensor module is configured to emit light to the finger and receive the reflected light from the finger for sensing a movement of the finger thereby controlling the pointer on the display. This kind of pointing device is compact and the sensing area is relatively small, which is disadvantaged in low resolution, hard to precisely control the pointer, hard to move the pointer fast, etc.

Besides, the aforementioned conventional mouse is difficult in controlling the pointer to move very straight toward a direction, to move along a particular path, to draw a fair arc or to have an accurate fine movement due to the unstable operation of human hands and fingers.

Recently, a kind of pointing device having a capacitive touch module (CTM) or a resistive touch module (RTM) is provided. The CTM or RTM is applied to sense the touching motion of fingers for activating commands. More particularly, the CTM or RTM includes a sensor array uniformly distributed over a sensing area. When the fingers properly touch on the sensing area, the touching motion will cause an electrical variation of the sensor array that indicates the touched position on the sensor array. However, to ensure correct detection of fingers, the whole CTM or RTM has to maintain in function-well condition. Once a portion of the CTM or RTM is failed, the movement of fingers cannot be detected correctly. Furthermore, fingers have to substantially touch the CTM or RTM strong enough to be sensed by the pointing device. All of these properties limit the application of the technologies.

Thus, it is important to provide a pointing device that may activate commands in various ways without using buttons and move precisely for better control.

SUMMARY

The present invention provides a hybrid pointing device including an optical navigation module and a pointing module. The pointing module is configured to sense a movement of the hybrid pointing device relative to a surface for moving a pointer on a display. The optical navigation module is configured to replace the conventional buttons (such as left button, right button, or rolling wheel) of a conventional pointing device, such as an optical mouse or a trackball mouse. The optical navigation module is configured to sense gestures of at least one finger of a user to activate commands associated with particular programs running on a host. Since the optical navigation module is only configured to sense gestures of the finger but not the movement of the hybrid pointing device relative to the surface, the resolution of the optical navigation module is aimed to be sufficiently high enough for sensing gestures and no need to relatively high.

The present invention further provides a hybrid pointing device including an optical navigation module and a pointing module. The optical navigation module is configured to assist in moving the pointer more close to the user's demands. By sensing a particular gesture of at least one finger, the optical navigation module may be configured to activate a command for limiting the moving direction of the pointer so as to move the pointer in a straight line on the display, or to roll the window up-down, or to roll the window left-right. Therefore, the user may operate the pointer very precisely along a desired direction better than a conventional pointing device. Besides, by sensing a particular gesture of at least one finger, the optical navigation module may be configured to directly move the pointer, to move the pointer at a relatively higher speed on the display, or to directly move the pointer in a limited range or to move the window in different speeds with the assistance of at least one key on a keyboard.

The present invention further provides a hybrid pointing device for being operated by a user to work on a surface and result in a relative movement between the hybrid pointing device and the surface. The hybrid pointing device includes a first module, a second module, an operation field and a processor. The first module is configured to sense the relative movement of the hybrid pointing device relative to the surface. The second module includes a light source configured to emit light and an image sensor configured to capture an image containing at least one light spot of at least one object operated by the user from reflecting the light emitted by the light source. The operation field is for the object to be operated thereon. The processor is configured to identify a relative distance between the object and the light source according to a variation of the light spot in the image and to generate a distance signal, wherein the processor generates the distance signal indicating that the object touches the operation field or the object is above the operation field within a certain range.

In one aspect, the processor does not generate the distance signal when the relative distance is identified to be between a surface of the operation field and the certain range.

In one aspect, the processor identifies that the relative distance is within an ignored range when an intensity of the light spot is within a predetermined intensity range and/or an area of the light spot is within a predetermined area range.

Since the optical navigation module may be operated in many ways, such as sliding at least one finger, posing a gesture, multi-touching of fingers, clicking of at least one finger, rotating at least one finger, etc., the optical navigation module provides a more instinctive way of operating the pointer or the window on the display rather than conventional pointing devices in which a user may only choose press or not to press buttons thereon to activate commands.

The optical navigation module of the present invention includes at least one image sensor and at least one light source. The light source emits light and at least one object operated by a user reflects the emitted light to be received by the image sensor. Since different motions of gestures of the object cause different images on the image sensor, the optical navigation module then transforms the images into electric signals for controlling the pointer shown on a display or for activating particular programs running on a host.

The hybrid pointing device of the present invention is for being operated by a user on a surface. The hybrid pointing device includes a first module, a second module and a processor. The first module is configured to sense a movement of the hybrid pointing device relative to the surface. The second module includes a light source and an image sensor. The light source is configured to emit light. The image sensor is configured to capture an image containing at least one light spot of at least one object operated by the user from reflecting the light emitted by the light source. The processor is configured to identify gestures according to a position information of the light spot on the image.

In an aspect of the present invention mentioned above, the position information of the light spot on the image is retrieved from a look-up table formed by dividing a field of view of the image sensor into a matrix of many sub-areas and pre-stored in the processor.

The present invention is able to be integrated with the conventional structure of optical mouse or trackball mouse by adding the optical navigation module of the present invention and changing related periphery devices. In an aspect of the present invention, the first module and the second module included in the hybrid pointing device may share the same light source.

BRIEF DESCRIPTION OF THE DRAWINGS

Other objects, advantages, and novel features of the present invention will become more apparent from the following detailed description when taken in conjunction with the accompanying drawings.

FIG. 8b shows a cross-sectional view taken along line A-A' of FIG. 8a.

DETAILED DESCRIPTION OF THE EMBODIMENT

In the descriptions that follow, the present invention will be described in reference to the embodiments that describe a hybrid pointing device with optical navigation module for replacing the conventional pointing device with buttons. However, embodiments of the present invention are not limited to any particular environment, application or implement. Therefore, the descriptions of the embodiments that follow are for purpose of illustration and not limitation. It is understood that elements indirectly related to the present invention are omitted and are not shown in the following embodiments and drawings.

The following figures show several examples of the present invention, which are similar to conventional mouse. That is, the hybrid pointing devices of the present invention shown below are intended to be placed on a smooth working surface, and the hybrid pointing devices include a pointing module that emits light to the working surface and receives the reflected light from the working surface for controlling the movement of a pointer shown on a display of a host. In other embodiment, the pointing module may be replaced by other equipment, such as a trackball pointing module. People skilled in the art know well the functions of conventional pointing modules, and redundant explanation is omitted hereinafter.

Figure 1:
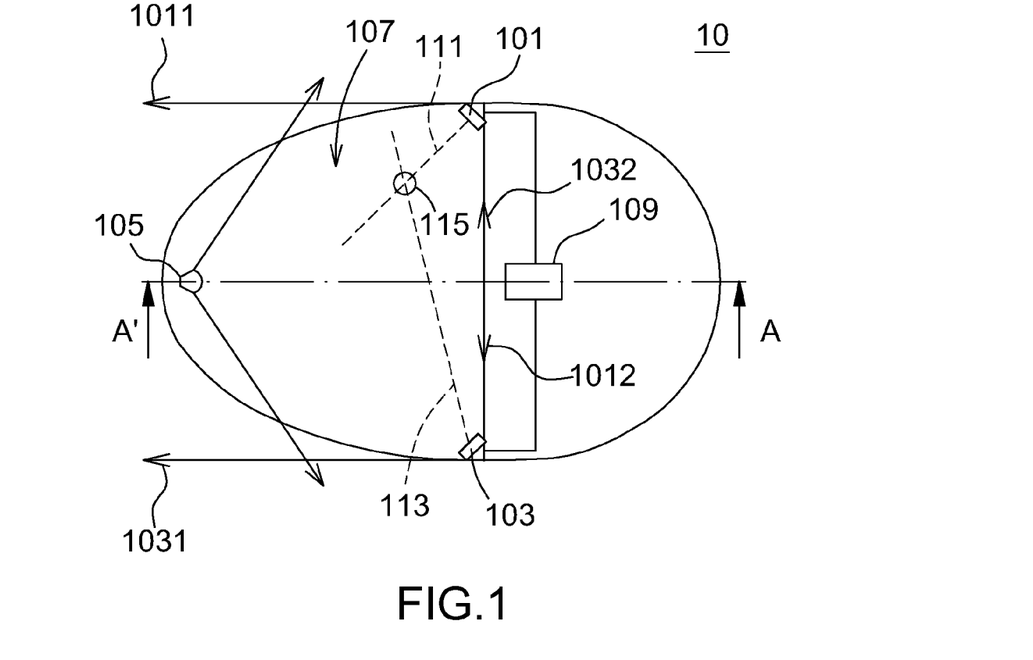
FIG. 1 shows a top view of the hybrid pointing device according to the first embodiment of the present invention.
Figure 2:
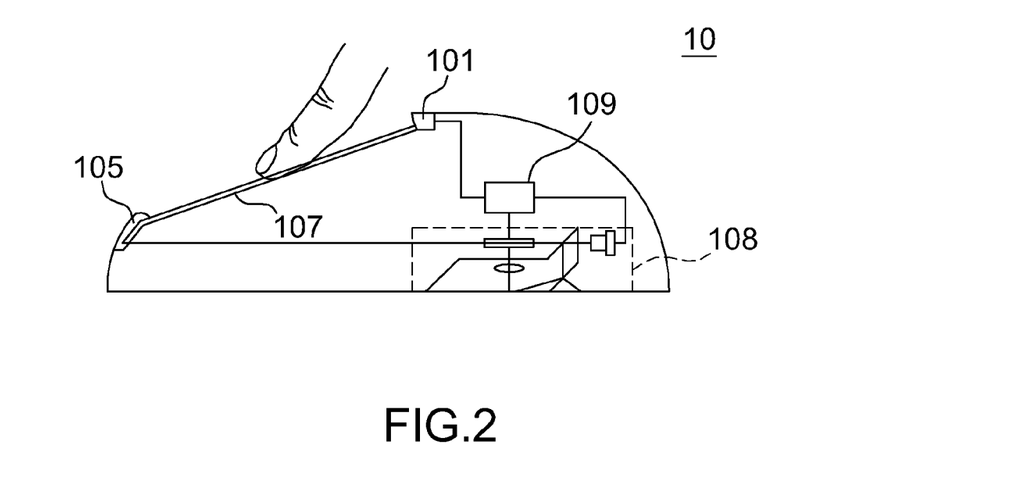
FIG. 2 shows a cross-sectional view taken along line A-A' of FIG. 1.

FIG. 1 shows a top view of the hybrid pointing device according to the first embodiment of the present invention. The hybrid pointing device 10 includes an optical navigation module having two image sensors 101, 103, a light source 105 and a processor 109, which is electrically connected to the image sensors 101, 103 and the light source 105. It is noted that the number of the light source and the image sensor is not the limitation of the present invention. In this embodiment, the processor 109 may also electrically connect to the pointing module 108 (shown in FIG. 2) for processing the data therefrom. However, in other embodiment, the pointing module 108 may include another processor operating separately. The image sensor is configured to optically cover the operation field 107 of the hybrid pointing device 10. In this embodiment, the image sensors 101, 103 are configured to optically cover the operation field 107 as shown in FIG. 2, which is a cross-sectional view taken along line A-A' of the hybrid pointing device 10 shown in FIG. 1. It is noted that the processor 109 shown in FIG. 2 is only a sketch block for illustration. The image sensors 101, 103 are disposed corresponding to the light source 105; therefore, the image sensors 101, 103 may receive the light emitted from the light source 105. The operation field 107 in the first embodiment is a tiled surface on which a user can conventionally put his or her fingers and move the fingers thereon. In other embodiment, the operation field 107 may be set horizontally or with concave shapes, as long as the operation field 107 would not blank the image sensors 101, 103 from receiving the emitted light from the light source 105. In other embodiment, the image sensors 101, 103 and the light source 105 may be placed in different positions, as long as a field of view of the image sensor 101, 103 is able to cover the light source 105. The light source 105 may be illuminated by the light source of the pointing module 108 via particular light guiding mechanism as shown in FIG. 2, i.e. the optical navigation module and the pointing module 108 share the same light source. The light source 105 may be an independent light source from the pointing module 108 in other embodiment.

More particular, relative positions between the light source 105 and the image sensors 101, 103 are limited by the field of view of the image sensor and the emitting field of the light source. The emitting field of the light source means the field that can be illuminated by the emitted light of the light source. Generally, an image sensor is characterized with a field of view, which defines the maximum field that it can sense. For example, the image sensor 101 roughly has a 90 degree field of view shown by two arrows 1011, 1012. The two arrows 1011, 1012 denote two boundary sides that the image sensor 101 cannot sense an object located outside the field of view. Similarly, the image sensor 103 may also have a 90 degree field of view shown by another two arrows 1031, 1032. In the first embodiment, the image sensors 101, 103 both have fields of view that cover the emitting field of the light source 105. In another embodiment, the light sources 101, 103 may be replaced with a linear light source, such as a light bar that can emit substantially parallel lights.

Figure 3A:
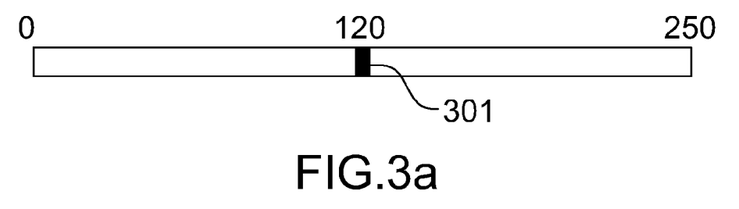
FIG. 3a-3b shows a schematic diagram of the interruption sensed by the image sensor shown in FIG. 1.
Figure 3B:
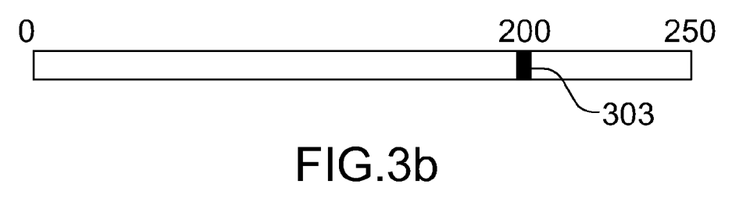

When a user puts at least one finger on the operation field 107, the finger blocks the light emitted from the light source 105 and causes at least one interruption on the image sensors 101, 103. Please refer to FIGS. 3a and 3b, they show schematic diagrams of an interruption sensed by the image sensors 101, 103, respectively. The image sensors 101 and 103 are linear image sensors in this embodiment, and the finger caused an interruption respectively in images 301 and 303, which are images captured by the image sensor 101, 103, respectively. Each of the images 301 and 303 shows a numerical value, which denotes the projection position within the field of view of each image sensor from one boundary to the other. In the embodiment, for example, each image sensor has a numerical value from 0 to 255. When a user puts at least one finger on the operation field 107, the finger blocks the emitted light and respectively causes an interruption 301 and 303 on the image sensors 101 and 103. The interruption 301 takes, for example, the numerical value of 120 and the interruption 303 takes, for example, the numerical value of 200, as shown in FIGS. 3a and 3b. It is appreciated that the user may also use other object, e.g. a touch pen, a touch stick or the like to operate inside the operation field 107 rather than use his or her finger in all embodiments of the present invention.

Virtually, it is able to draw a line 111 through the image sensor 101 and the position 115 of the touched finger, and a line 113 through the image sensor 103 and the position 115 of the touched finger. The positions of the image sensors 101, 103 may be mapped into two sets of coordinate values based on any conventional coordinate systems, such as a polar coordinate system or a Cartesian coordinate system. Then the processor 109 maps two numerical values, e.g. 120 and 200, into a set of coordinate value, i.e. a touch coordinate value, based on the same coordinate system and gets two equations from the lines 111 and 113. By solving the two equations, the processor 109 may realize the position 115 of the touched finger on the operation field 107. When the touched finger moves, the processor 109 can track the finger by continuously realizing the varied position of the touched finger. Once the touched finger moves to leaving the operation field 107, the processor 109 may also be aware of a fast variation caused by disappearance of the touched coordinate value.

In other embodiments, the image sensor 101 can also be configured to receive the light reflected from the finger when the finger places on the operation field 107 and the light emitting from the light source 105 would be reflected by the finger and form a light spot on the image sensor 101. Positions of the light source 105 and the operation field 107 are predetermined, thus the movement of finger can be traced by monitoring the variation of light spot on the image sensor 101. For example, when the brightness of light spot increased, which means that finger is closer to the light source, vice versa. Or, when the area of the light spot increases, the signal represents the relative distance being increased, vice versa. The area of the light spot is determined according to the brightness of pixels of the image sensor, and the area comprises pixels with brightness exceeding a predetermined threshold value.

Figure 8A:
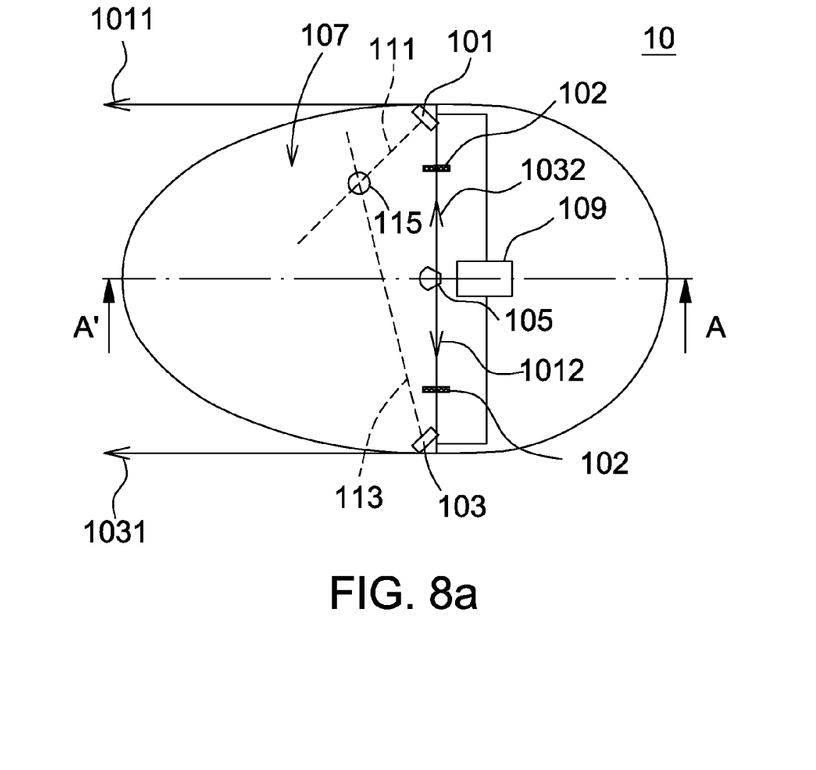
FIG. 8a shows a top view of the hybrid pointing device according to another embodiment of the present invention.
Figure 8B:
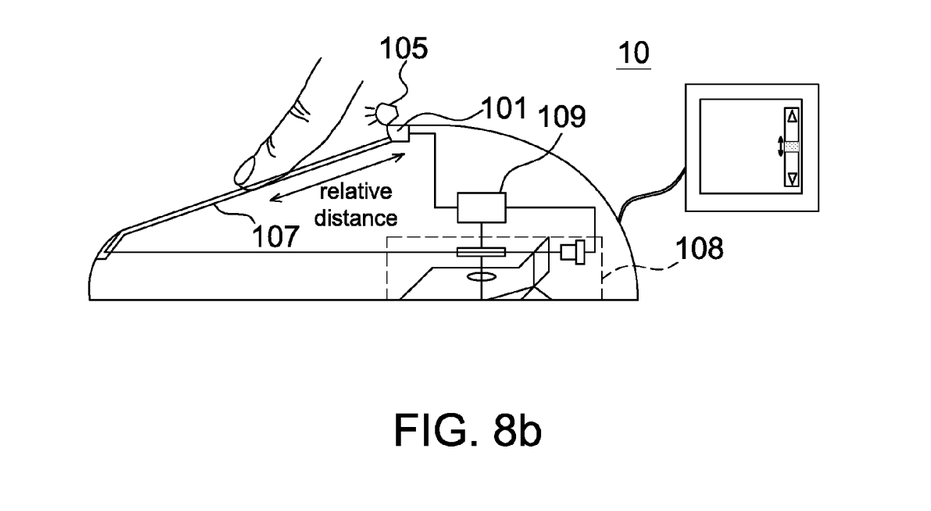
Figure 9A:
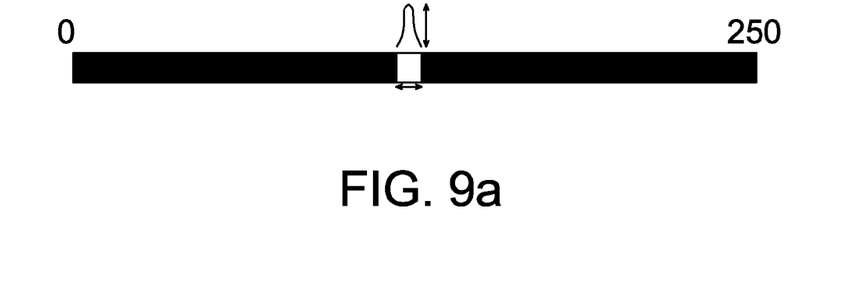
FIGS. 9a-9b show schematic diagrams of the light spot sensed by the image sensor of the hybrid pointing device.
Figure 9B:
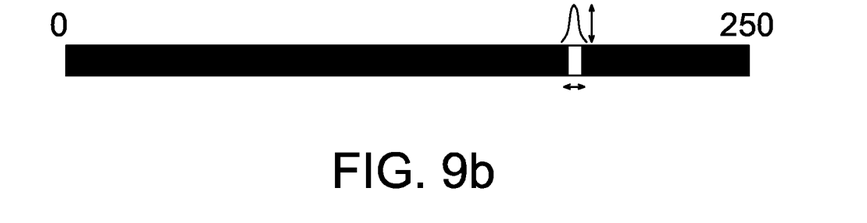

In another embodiment, the hybrid pointing device has an operation surface for the user to place finger on the operation surface. The processor 109 is configured to determine the relative distance between the finger and the light source 105 according to the triangular geometric relation formed by the position of the light spot, the light source 105, and the finger. The processor 109 is configured to identify a relative distance between the object and the light source 105 (as shown in FIG. 8b) according to a variation of the light spot in the image (as shown in FIGS. 9a and 9b) and to generate a distance signal. Thus, the movement of finger can be traced. The second module has an isolation device 102 (as shown in FIG. 8a) to limit the light emitting from the light source 105 not directly received by the image sensor 101 and 103.

The aforementioned variation of distance is configured to activate corresponding commands, such as a command in replace of rolling wheel to control the window rolling on the display.

Once the optical navigation module can track the movement of at least one finger, the tracking data may be used to activate particular commands. For example, if the touched finger moves toward right side, the optical navigation module can retrieve the tracking data and activate a command of scrolling the on-viewing page. If two touched fingers move apart or closer, the tracking data may be configured to activate a command of enlarging or shrinking the on-viewing screen or picture. If at least one touched finger moves clockwise or counterclockwise, the tracking data may be configured to rotate the on-viewing screen or picture. Furthermore, the user can set desired commands corresponding to particular motions of fingers.

Figure 4:
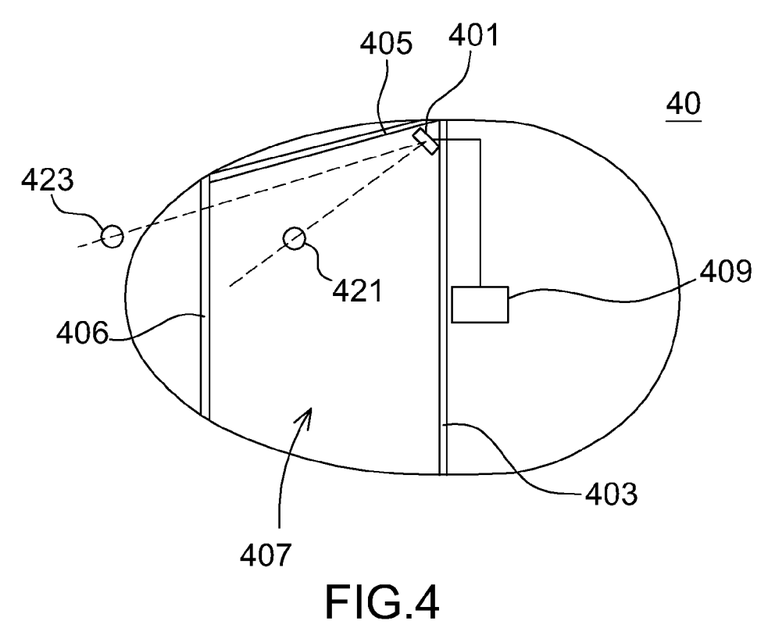
FIG. 4 shows a top view of the hybrid pointing device according to the second embodiment of the present invention.

FIG. 4 shows a top view of the hybrid pointing device 40 according to the second embodiment of the present invention. The main different between the first and second embodiments is that the second embodiment uses only one image sensor 401 with a reflector 406 and two linear light sources 403 and 405. In other embodiment, the linear light sources 403 and 405 may be formed as one linear light source and the reflector 406 may extend to a proper length, along a different direction, inside the field of view of the image sensor 401, e.g. to an edge opposite to the light source 405 in FIG. 4, or may be consisted several pieces of mirrors. In an alternative embodiment, one of the linear light sources 403 and 405 may be an active light source to emit light and the other may be a passive light source, e.g. a reflecting cloth, to reflect light emitted by the active light source. It can be understood that when a finger touches the operation field 407 on a position 421, it will cause a mirror image at a position 423 symmetrical to the position 421 by the reflector 406. A touched finger will cause two interruptions on the image sensor 401 (one is formed from blocking the light reflected by the reflector 406 and the other is the mirror image in the reflector 406 mapped from the finger on the position 421) and generates two numerical values, then the processor 409 maps two numerical values into coordinate values. As mentioned above, the position of the image sensor 401 may also be mapped into coordinate value. By solving the equations made of these coordinate values, the processor 409 can realize the position of the touched finger.

Figure 5:
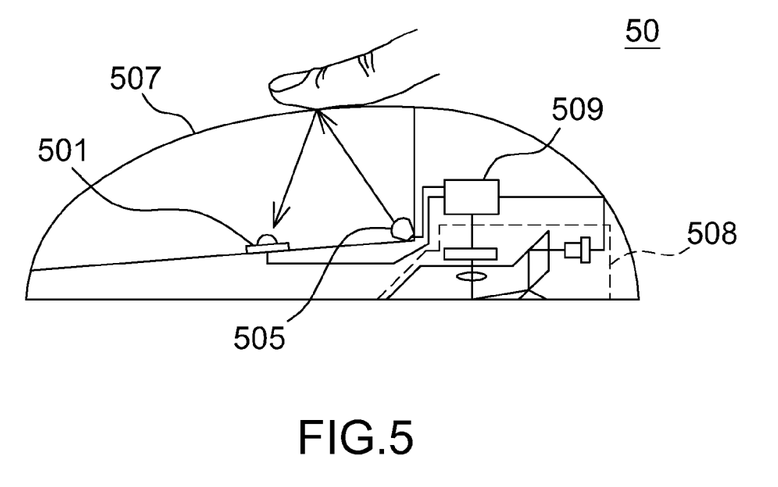
FIG. 5 shows a schematic diagram of the hybrid pointing device according to the third embodiment of the present invention.

FIG. 5 shows a schematic diagram of the hybrid pointing device 50 according to the third embodiment of the present invention. The hybrid pointing device 50 includes an image sensor 501, a light source 505 and a processor 509 electrically connected to the image sensor 501, the light source 505 and a pointing module 508. It is noted that the number of the light source and the image sensor is not the limitation of the present invention. The hybrid pointing device 50 further includes an operation field 507, which is an upper surface of a touch plate, for a user to place at least one finger and move the finger thereon. The light source 505 emits light and the finger of the user reflects the emitted light as shown in FIG. 5. Then the reflected light is received by the image sensor 501. The processor 509 is then able to identify the position of the finger on the operation field 507 and continuously track the movement of the finger thereon. The tracking data are used to activate particular commands as aforementioned in the first and second embodiments.

Moreover, since different motions of gestures of at least one finger cause different images on the image sensor 501, the user may activate commands by different gestures of at least one finger by technologies of image identification. When there is no finger on the operation field 507, the light emitted from the light source 505 will go outward and the image sensor 501 cannot sense any reflected light from the operation field 507, i.e. the touch plate is transparent to the light emitted by the light source 505. When the user puts at least one finger on the operation field 507, the light emitted from the light source 505 will be reflected from the surface between the touched finger and the operation field 507 and causes at least one gradual light spot on the image sensed by the image sensor 505. The processor 509 then transforms the images into electric signals for controlling the pointer shown on a display or for activating particular programs running on a host.

Figure 6A:
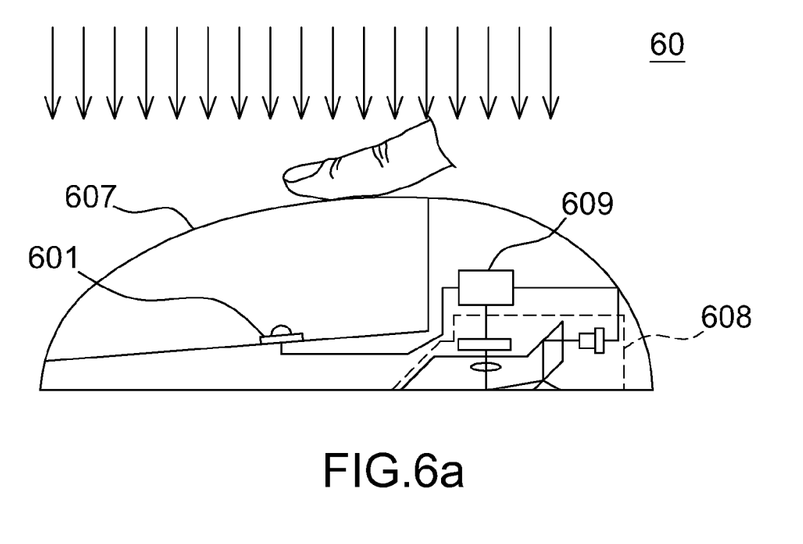
FIG. 6a shows a schematic diagram of the hybrid pointing device according to the fourth embodiment of the present invention.

FIG. 6a shows a schematic diagram of the hybrid pointing device 60 according to the fourth embodiment of the present invention. The hybrid pointing device 60 includes an image sensor 601 and a processor 609 electrically connected to the image sensor 601 and a pointing module 608. The image sensor 601 directly senses the operation field 607 when the ambient light is sufficiently bright, and the image sensor 601 is able to identify at least one finger placed on the operation field 607 from the environment. It is noted that the number of the image sensor is not the limitation of the present invention.

Figure 6B:
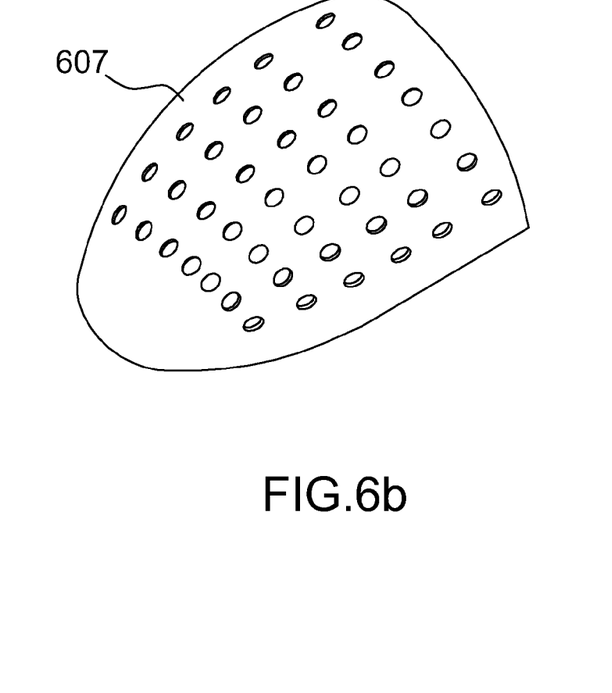
FIG. 6b shows a schematic diagram of the touch plate of the hybrid pointing device according to the fourth embodiment of the present invention, wherein the touch plate is formed with a plurality of through holes thereon.

The finger placed on the operation field 607 would cause shadows with different shapes. Then the shadows are sensed by the image sensor 601. The processor 609 is then able to identify the position of the finger on the operation field 607 and continuously track the movement of the finger thereon. The tracking data are used to activate particular commands as aforementioned in the first and second embodiments. Moreover, since different motions of gestures of at least one finger cause different images on the images sensor 601, the user may activate commands by different gestures of at least one finger. The processor 609 may be configured to identify the images caused by different gestures by technologies of image identification as aforementioned in the third embodiment. Since the image sensor 601 is configured to sense the shadows of the touched finger from blocking ambient light, the touch plate may be formed with a plurality of through holes thereon, as shown in FIG. 6b, such that the processor 609 is able to identify the position of the finger on the operation field 607 according to the through holes blocked by the touched finger and continuously track the movement of the finger on the operation field 607. It is appreciated that the shape and the density of the through holes shown in FIG. 6b are not limitations of the present invention.

In other embodiment, the operation field 507 and 607 may have a light guider being configured to guide light through the whole operation field. For example, in FIG. 5, the light source 505 may be rearranged to be placed at one end of the operation field 507, which has a light guider, and then the emitted light goes along the light guider operation field 507. The image sensor 501 then senses an image of the operation field 507 with normally distributed light intensity. When the user puts at least one finger on the operation field 507, the touched finger will change the light intensity, and the sensed image will show at least one interruption caused by the touched finger. The processor 509 may be configured to identify the sensed image by technologies of image identification as aforementioned in the third embodiment. In FIG. 6a, the operation field 607 may have a light guider for guiding the ambient light or light of an auxiliary light source through the whole operation field 607, then the image sensor 601 is configured to operation as well as the image sensor 501 just mentioned above.

Since the optical navigation module of the present invention is configured to sense the gesture or movement of a user's finger, the resolution of the image sensor of all aforementioned embodiments may be not as high as the sensor of the pointing module. More particularly, the resolution of the image sensor is aimed to be sufficiently high enough for sensing gesture or movement of at least one finger but not the details of the finger's surface, such as the finger print. In other words, as long as the image sensor is able to sense a rough outline of the finger, the resolution of the image sensor is enough. Embodiments of the image sensor include a charge coupled device (CCD) image sensor, a complementary metal oxide semiconductor (CMOS) image sensor, or the like.

In addition, the hybrid pointing devices mentioned above may further include a transmission interface unit for transmitting the movement sensed by the pointing module to a display for moving a pointer on the display and for transmitting commands corresponding to gestures of the finger identified by the processor for activating particular programs running on a host or for directly moving the pointer on the display.

The operation field of all aforementioned embodiments can be divided into a collection of many sub-areas in light of the coordinate system the optical navigation module applies. Taking Cartesian coordinate system as an example, please refer to FIG. 7, it shows a schematic diagram of the operation field divided as a matrix of many sub-areas. It is assumed that the touched finger occupies the position 71 on the operation field and then moves to the position 72. The optical navigation module only needs to continuously sense which sub-area is touched by the finger for calculating the movement of the touched finger, then activated particular commands in response to the movement. Even more, the optical navigation module can only sense the start point and the end point when the touched finger moves to retrieve the moving direction of the touched finger, then activated particular commands in response to the moving information of the touched finger.

Figure 7:
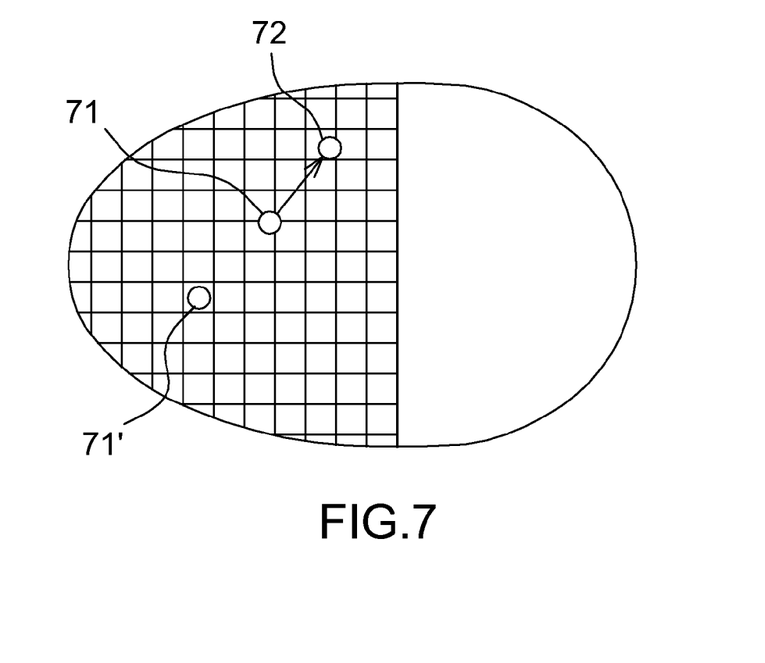
FIG. 7 shows a schematic diagram of the operation field divided as a matrix of many sub-areas.

When the finger touches more than one sub-area at once, like the positions 71 and 71' shown in FIG. 7, the optical navigation module can estimate the position information by many ways such as, but not limited to, averaging corresponding coordinate values of the two sub-areas, taking the two sub-areas together as a start point, choosing the one sub-area which is occupied by the touched finger most, randomly choosing one of the touched sub-areas, etc. Meanwhile, the optical navigation module may pre-store the position information of the sub-areas in advance, such as storing the position information in a look-up table stored in a memory device, and then retrieves the pre-stored position information when the finger touched the operation field so as to enhance the processing speed. Since the main objective of the optical navigation module is to determine the gesture or movement of the fingers, as long as the optical navigation module applies the same way to estimate the position information, the output of the optical navigation module can be applied to determine the gesture or movement of the fingers.

The aforementioned light source may be any conventional light source, such as LED, LD, IR, etc., and is not a limitation of the present invention. The advantage of applying IR as the light source is to use the invisible character thereof to prevent from affecting the user's sense of sight. The tracking data retrieved from the movement of the touched fingers are also available in assisting moving the pointer shown on the display. For example, when the optical navigation module senses the touched finger moving in a direction identical to the direction that the pointing module moves, e.g. the touched finger moves toward left as well as the pointing module moves the pointer toward left, the pointer may be accelerated in moving faster toward left. Or the optical navigation module can temporarily control the movement of the pointer, with or without the assistance of at least one key on a keyboard, by moving at least one finger on the operation field after the optical navigation module senses a particular gesture. The operation field and/or the image sensor of the aforementioned embodiments may be placed with a tilted angle for placing the fingers conveniently and easier sensing the image.

Figure 10:
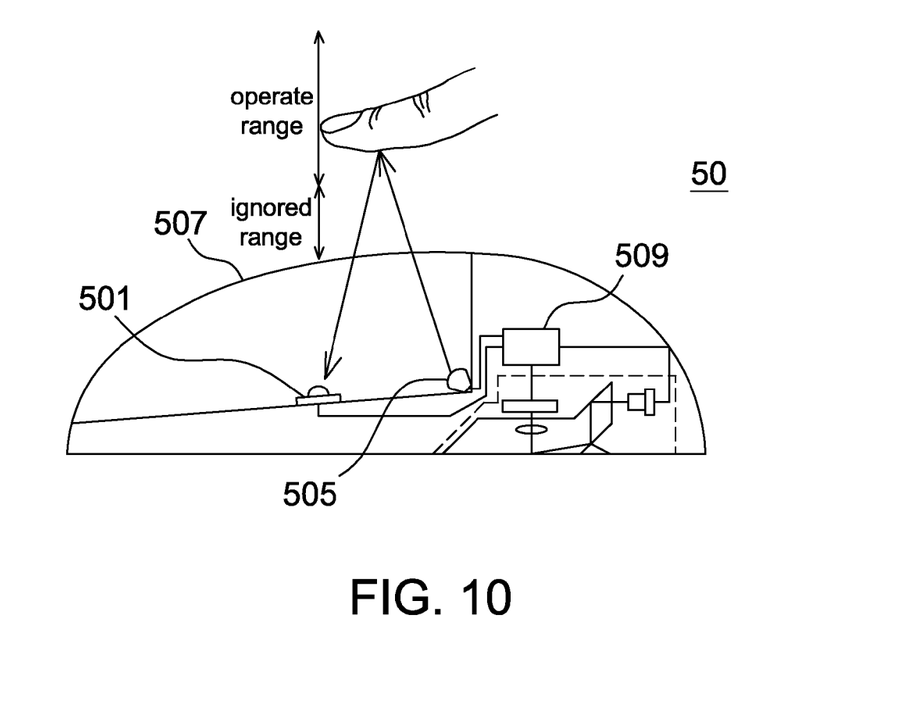
FIG. 10 shows another schematic diagram of the hybrid pointing device according to the third embodiment of the present invention.
Figure 11A:
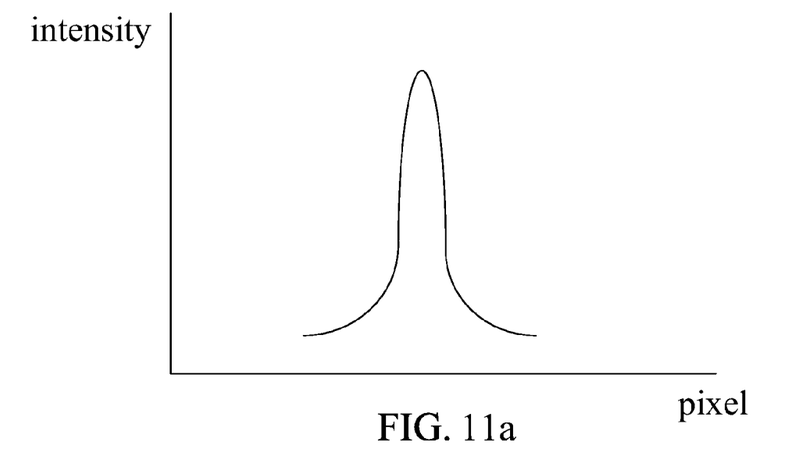
FIG. 11a shows a schematic diagram of the intensity of the light spot when the finger is in contact with the operation field.
Figure 11B:
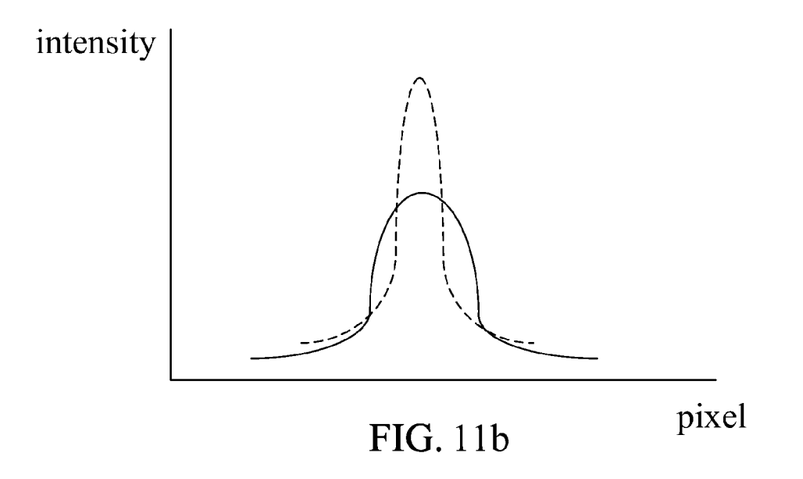
FIG. 11b shows a schematic diagram of the intensity variation of the light spot when the finger moves from touching the operation field to a certain range.

FIGS. 11a and 11b show the variation of the light spot when the finger moves from touching the operation field to a certain range. Referring to FIG. 11a, it shows intensity variation in one direction of the pixel array when finger touches the operation field 507, as shown in FIG. 5. And FIG. 11b shows intensity variation when the finger leaves above the operation field 507 within a certain range, as shown in FIG. 10. It is understood that when the finger leaves up from the operation field 507, the maximum intensity (e.g. FIG. 11a) decreases and the cover range of the pixel array increases (e.g. FIG. 11b). According to the principle, the processor 509 is configured to determine whether the finger touches the operation field 507 or leaves above the operation field 507 within a certain range, preferred to be from 2.5 cm to 10 cm. In other words, the present invention is configured to ignore finger movement from leaving the operation field 507 to before entering the certain range, i.e. an ignored range may be defined. When the finger moves closely to the operation field 507, the processor 509 may ambiguously determine whether the finger touches the operation field 507 or not, and cause unnecessary interference. The present invention is able to avoid the ambiguous status by ignoring the finger operation, as shown in FIG. 10, when the intensity of reflected light is larger than an intensity threshold and not consistent with a maximum intensity occurring in the contact state (i.e. within a predetermined intensity range) and/or when the reflected light covers the pixel array in an area within a predetermined area range. It means that the finger is close to the operation field 507 but not in contact with the operation field 507; i.e. the processor 509 does not generate a distance signal when the relative distance is identified to be between a surface of the operation field 507 and the certain range.

FIGS. 11a and 11b showing pixel in one dimension, since pixel array has two dimensional distribution, the present invention can determine whether the finger is within a proper operate range above the operation field 507 or directly touches the operation field 507 by considering pixels in two dimensional direction.

In addition, in order to eliminate the interference from an improper operation, e.g. a palm entering the operation field 507, the processor 509 may ignore the light spot in the captured image having an area larger than an upper threshold. That is, when the processor 509 identifies that the light spot is too large, which is caused by the palm of the user, the processor 509 does not calculate the relative distance from the palm to the surface of the operation field 507.

As mentioned above, conventional pointing devices with optical sensor module have problems of hard to precisely control the pointer and hard to move the pointer in a relatively higher speed. And the conventional pointing devices with CTM or RTM have to be operated with relatively larger pressing force and have to be maintained in function-well condition. Therefore, the present invention provides a hybrid pointing device that has multi-touch functions so as to be operated in a more instinctive way and may operate the pointer very precisely along a desired direction and a path than the conventional pointing devices. Furthermore, since the optical navigation module of the present invention is configured to sense the gesture or movement of a user's finger, the resolution of the image sensor of all aforementioned embodiments may be not as high as the sensor of the pointing module.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A hybrid pointing device for being operated by a user to work on a surface and result in a relative movement between the hybrid pointing device and the surface, the hybrid pointing device comprising:
a first module configured to sense the relative movement of the hybrid pointing device relative to the surface;
a second module, comprising:
a light source configured to emit light; and
an image sensor configured to capture an image containing at least one light spot of at least one object operated by the user from reflecting the light emitted by the light source;
an operation field for the object to be operated thereon; and
a processor configured to identify a relative distance between the object and the light source according to a variation of the light spot in the image and to generate a distance signal,
wherein the processor generates the distance signal indicating that the object touches the operation field or the object is above the operation field within a certain range and the processor does not generate the distance signal when the relative distance is identified to be between a surface of the operation field and the certain range.

2. The hybrid pointing device as claimed in claim 1, wherein the certain range is from 2.5 cm to 10 cm.

3. The hybrid pointing device as claimed in claim 1, wherein the first module is an optical navigation module or a mechanical navigation module.

4. The hybrid pointing device as claimed in claim 1, wherein the processor is configured to generate a movement signal in response to the relative movement.

5. The hybrid pointing device as claimed in claim 1, wherein the variation of the light spot is an intensity variation.

6. The hybrid pointing device as claimed in claim 1, wherein an area of the light spot is determined according to pixels of the image sensor having brightness exceeding a predetermined threshold value.

7. The hybrid pointing device as claimed in claim 1, wherein the processor identifies that the relative distance is within an ignored range when an intensity of the light spot is within a predetermined intensity range.

8. The hybrid pointing device as claimed in claim 1, wherein the processor identifies that the relative distance is within an ignored range when an area of the light spot is within a predetermined area range.

9. The hybrid pointing device as claimed in claim 1, wherein the processor is further configured to ignore the light spot having an area larger than an upper threshold.

10. A hybrid pointing device for being operated by a user to work on a surface and result in a relative movement between the hybrid pointing device and the surface, the hybrid pointing device comprising:
a first module configured to sense the relative movement of the hybrid pointing device relative to the surface;
a second module, comprising:
a light source configured to emit light; and
an image sensor configured to capture an image containing at least one light spot of at least one object operated by the user from reflecting the light emitted by the light source;
an operation field for the object to be operated thereon; and
a processor configured to identify a relative distance between the object and the operation field to be a touch, an ignored range or an operate range according to a variation of the light spot in the image,
wherein the ignored range is closer to the operation field than the operate range.

11. The hybrid pointing device as claimed in claim 10, wherein the operate range is from 2.5 cm to 10 cm.

12. The hybrid pointing device as claimed in claim 10, wherein the processor only generates a distance signal when the relative distance is identified to be the touch or the operate range.

13. The hybrid pointing device as claimed in claim 10, wherein the first module is an optical navigation module or a mechanical navigation module.

14. The hybrid pointing device as claimed in claim 10, wherein the processor is configured to generate a movement signal in response to the relative movement.

15. The hybrid pointing device as claimed in claim 10, wherein the variation of the light spot is an intensity variation.

16. The hybrid pointing device as claimed in claim 10, wherein an area of the light spot is determined according to pixels of the image sensor having brightness exceeding a predetermined threshold value.

17. The hybrid pointing device as claimed in claim 10, wherein the processor identifies that the relative distance is the ignored range when an intensity of the light spot is within a predetermined intensity range.

18. The hybrid pointing device as claimed in claim 10, wherein the processor identifies that the relative distance is the ignored range when an area of the light spot is within a predetermined area range.

19. The hybrid pointing device as claimed in claim 10, wherein the processor is further configured to ignore the light spot having an area larger than an upper threshold.

* * * * *

UNITED STATES PATENT AND TRADEMARK OFFICE
CERTIFICATE OF CORRECTION

PATENT NO. : 8,648,836 B2  Page 1 of 1
APPLICATION NO. : 13/754135
DATED : February 11, 2014
INVENTOR(S) : Ming-Tsan Kao et al.

It is certified that error appears in the above-identified patent and that said Letters Patent is hereby corrected as shown below:

Title Page: Item (72) Inventors: "Mig-Tsan Kao" should read --Ming-Tsan Kao--.

Signed and Sealed this
Ninth Day of September, 2014

Michelle K. Lee
*Deputy Director of the United States Patent and Trademark Office*